US012640014B2

(12) United States Patent
Garg et al.

(10) Patent No.:  US 12,640,014 B2
(45) Date of Patent:      May 26, 2026

(54) ZERO TRUST BASED ARTIFICIAL INTELLIGENCE ALGORITHM DRIVEN REIMAGE PROCESS ON AN AUTOMATED TELLER MACHINE LEVERAGING RAM PARTITIONING

(71) Applicant: Bank of America Corporation, Charlotte, NC (US)

(72) Inventors: Saurabh Garg, Faridabad (IN); Maneesh Sethia, Telangana (IN); Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/203,689

(22) Filed: May 31, 2023

(65) Prior Publication Data

US 2024/0404375 A1      Dec. 5, 2024

(51) Int. Cl.
*G07F 19/00*         (2006.01)
*G06T 17/00*         (2006.01)
*H04L 9/32*          (2006.01)

(52) U.S. Cl.
CPC ............ *G07F 19/209* (2013.01); *G06T 17/00* (2013.01); *H04L 9/3239* (2013.01)

(58) Field of Classification Search
CPC ...... G07F 19/209; G06T 17/00; H04L 9/3239
See application file for complete search history.

(56) References Cited

U.S. PATENT DOCUMENTS

| | | | |
|---|---|---|---|
| 8,613,387 B1 | 12/2013 | Billett et al. | |
| 10,621,833 B1 | 4/2020 | Dadhaniya et al. | |
| 10,777,047 B1 * | 9/2020 | Hamchuck ............ | G06T 19/006 |
| 10,878,668 B1 * | 12/2020 | van Beek Faletti .. | H04W 4/025 |
| 10,957,167 B1 * | 3/2021 | Moore .................. | G06T 19/006 |
| 11,276,279 B1 * | 3/2022 | Hamchuck ............ | G07F 19/209 |
| 11,288,679 B2 | 3/2022 | Adams et al. | |
| 11,688,251 B1 * | 6/2023 | Hamchuck ............ | G06T 19/006 |
| | | | 235/379 |
| 11,769,379 B1 * | 9/2023 | Singh ................... | G06N 3/0442 |
| | | | 235/379 |

(Continued)

OTHER PUBLICATIONS

Jawadwala et al. "ATM System using Augmented Reality Technology," International Research Journal of Engineering and Technology (IRJET), vol. 09 Issue: 03, Mar. 2022, 4 pages.

(Continued)

*Primary Examiner* — Thien M Le
*Assistant Examiner* — Asifa Habib
(74) *Attorney, Agent, or Firm* — Banner & Witcoff, Ltd.

(57)        ABSTRACT
Aspects of the disclosure relate to reimaging an ATM using an extended reality interface and machine learning models that are configured to reimage the ATM. A computing system may send a request for authorization to access an ATM. Based on the request being granted the ATM may be accessed via an extended reality interface. Reimaging the ATM may be based on inputting ATM data associated with a state of the ATM into machine learning models that are configured to generate instructions to reimage the ATM and then execute threads based on processes that were determined based on the instructions. The threads may be executed in a RAM of the ATM in accordance with machine learning model determined priorities of the threads.

20 Claims, 9 Drawing Sheets

(56) References Cited

U.S. PATENT DOCUMENTS

| | | | | |
|---|---|---|---|---|
| 12,394,283 | B1 * | 8/2025 | Mattison | G07F 19/209 |
| 2006/0026283 | A1 * | 2/2006 | Trueba | G06F 21/577 |
| | | | | 709/225 |
| 2006/0080653 | A1 * | 4/2006 | Siwatu | G06F 8/61 |
| | | | | 717/173 |
| 2014/0012753 | A1 | 1/2014 | Fuentes et al. | |
| 2014/0166744 | A1 * | 6/2014 | Crews | G07F 19/211 |
| | | | | 235/379 |
| 2016/0132887 | A1 * | 5/2016 | Lacoss-Arnold | G07F 19/207 |
| | | | | 705/43 |
| 2018/0074886 | A1 * | 3/2018 | Ewington | G07F 19/206 |
| 2019/0394243 | A1 * | 12/2019 | Wiig | G06N 3/043 |
| 2020/0143345 | A1 | 5/2020 | Adams et al. | |
| 2021/0327223 | A1 * | 10/2021 | Kumar | G07F 19/211 |
| 2023/0214844 | A1 * | 7/2023 | Fain | G06Q 40/02 |
| | | | | 705/35 |
| 2023/0290231 | A1 * | 9/2023 | Hamchuck | G06T 7/001 |
| 2023/0388278 | A1 * | 11/2023 | Crabtree | H04L 63/0428 |
| 2024/0037537 | A1 * | 2/2024 | Kleinman | G06Q 20/1235 |
| 2024/0235852 | A1 * | 7/2024 | Cate | H04L 9/3268 |
| 2024/0241769 | A1 * | 7/2024 | Smith | G06F 9/5088 |
| 2024/0413997 | A1 * | 12/2024 | Singh | H04L 9/3213 |

OTHER PUBLICATIONS

Wikipedia, "Homomorphic encryption" <https://en.wikipedia.org/wiki/Homomorphic_encryption>, 10 pages.
Duezguen et al. "Towards Secure and Usable Authentication for Augmented and Virtual Reality Head-Mounted Displays," Who Are You ?! Adventures in Authentication (WAY) Virtual Conference, Aug. 7, 2020, 6 pages.
Jain et al., "Revisiting Fully Homomorphic Encryption Schemes," School of Information Technology and Engineering (SITE) Vellore Institute of Technology, submitted May 10, 2023, 15 pages.
Rose et al. "Zero Trust Architecture," NIST Special Publication 800-207, National Institute of Standards and Technology, Aug. 2020, 59 pages.
He et al., "A Survey on Zero Trust Architecture: Challenges and Future Trends," Wireless Communications and Mobile Computing, vol. 2022, Article ID 6476274, 13 pages.
Apr. 2, 2024—(US) Notice of Allowance—U.S. Appl. No. 18/203,682.
Apr. 17, 2025—(US) Non-Final Office Action—U.S. Appl. No. 18/762,848.
Sep. 4, 2025—(US) Notice of Allowance—U.S. Appl. No. 18/762,848.

* cited by examiner

100

500

Figure 6:
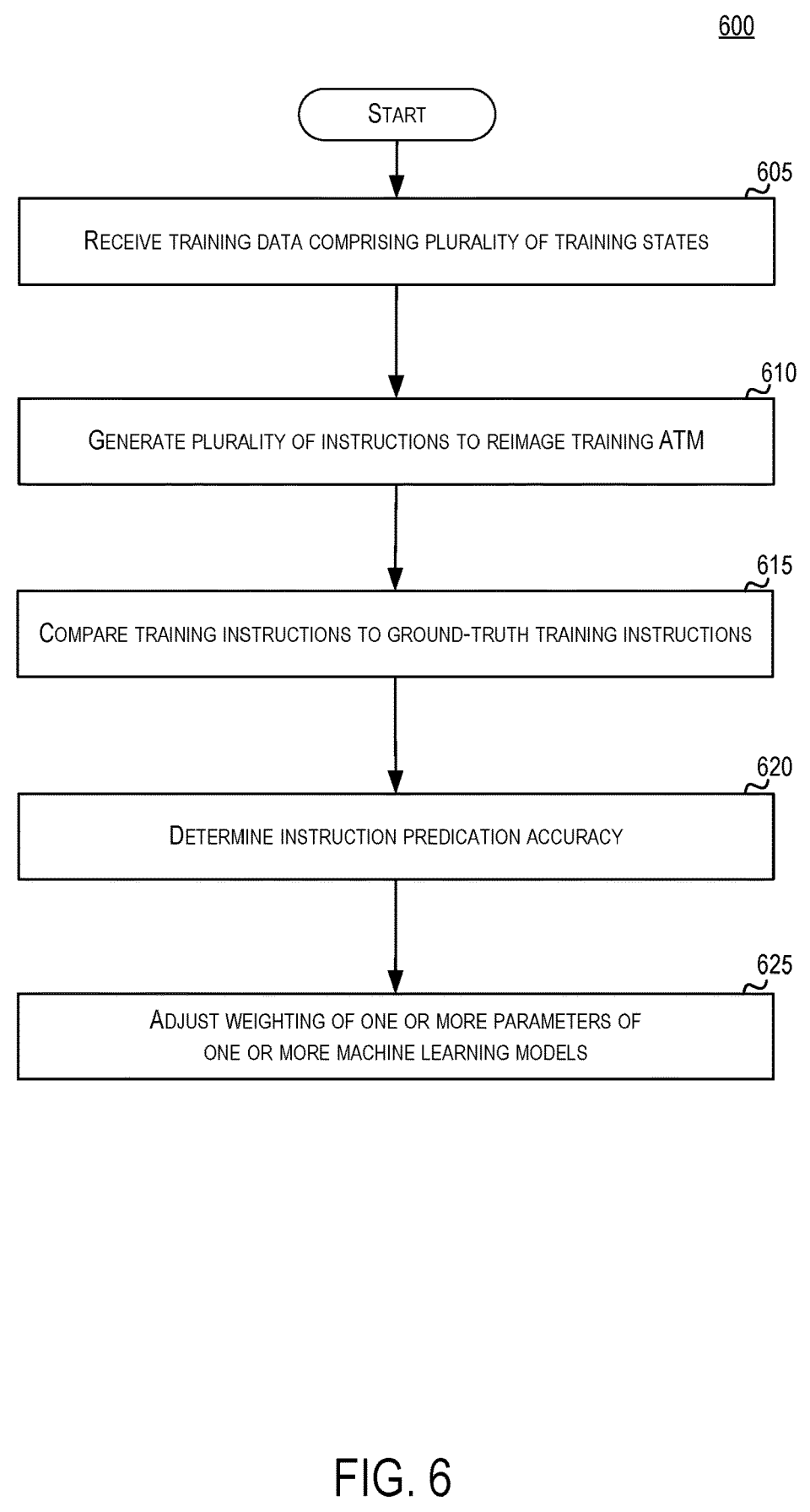

600

START

605

RECEIVE TRAINING DATA COMPRISING PLURALITY OF TRAINING STATES

610

GENERATE PLURALITY OF INSTRUCTIONS TO REIMAGE TRAINING ATM

615

COMPARE TRAINING INSTRUCTIONS TO GROUND-TRUTH TRAINING INSTRUCTIONS

620

DETERMINE INSTRUCTION PREDICATION ACCURACY

625

ADJUST WEIGHTING OF ONE OR MORE PARAMETERS OF
ONE OR MORE MACHINE LEARNING MODELS

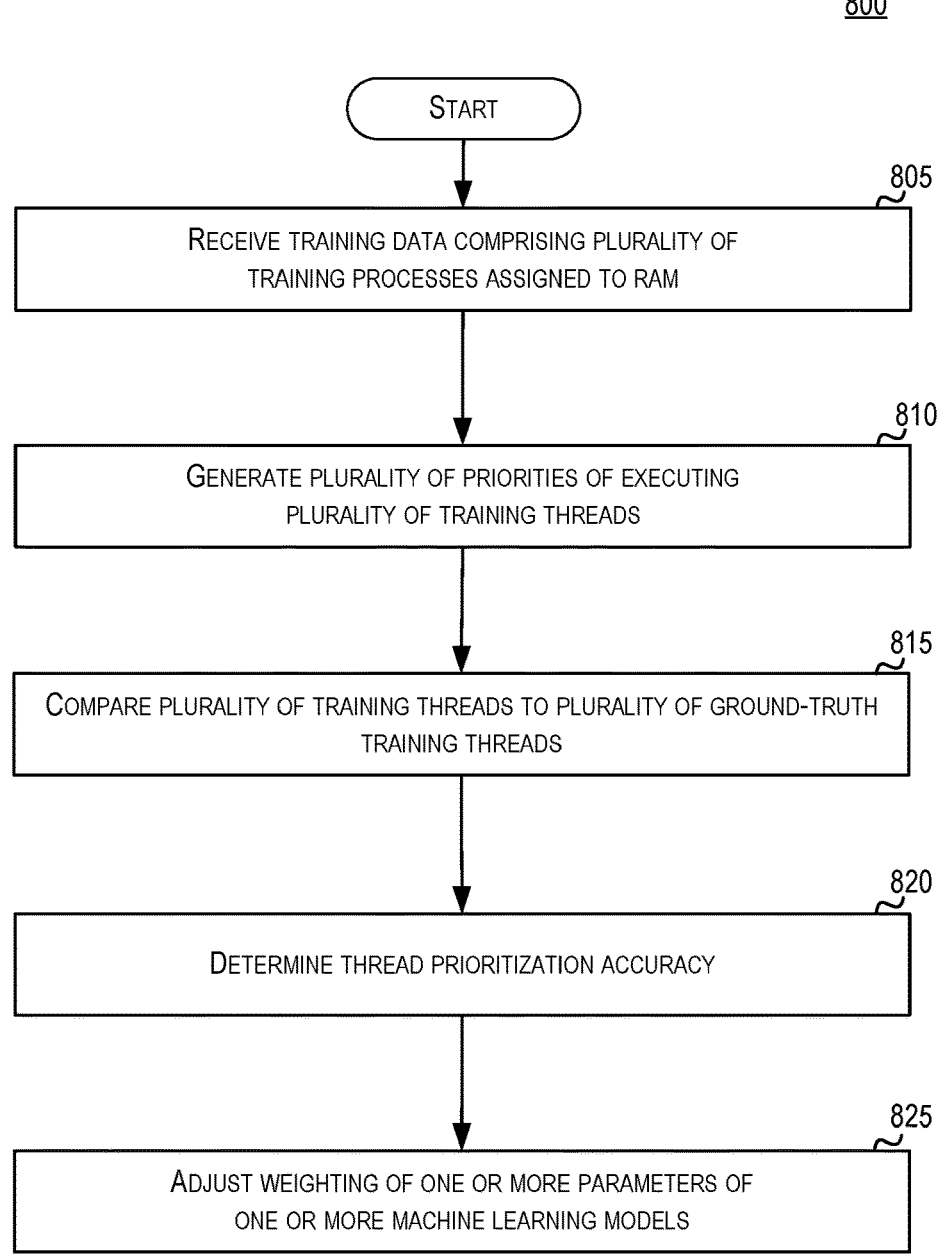

START

805

RECEIVE TRAINING DATA COMPRISING PLURALITY OF
TRAINING PROCESSES ASSIGNED TO RAM

810

GENERATE PLURALITY OF PRIORITIES OF EXECUTING
PLURALITY OF TRAINING THREADS

815

COMPARE PLURALITY OF TRAINING THREADS TO PLURALITY OF GROUND-TRUTH
TRAINING THREADS

820

DETERMINE THREAD PRIORITIZATION ACCURACY

825

ADJUST WEIGHTING OF ONE OR MORE PARAMETERS OF
ONE OR MORE MACHINE LEARNING MODELS

FIG. 8

ZERO TRUST BASED ARTIFICIAL INTELLIGENCE ALGORITHM DRIVEN REIMAGE PROCESS ON AN AUTOMATED TELLER MACHINE LEVERAGING RAM PARTITIONING

TECHNICAL FIELD

Some aspects of the disclosure relate to automatically reimaging an automated teller machine (ATM). Some aspects of the disclosure pertain to the use of a virtual reality interface to access an ATM and use machine learning models that are configured to determine drivers to use to reimage the ATM.

BACKGROUND

Imaging or reimaging an automated teller machine ("ATM"), also known as a banking machine, may be performed to update the software of the ATM. Keeping the software of the ATM up to date has various benefits including implementing security new features and plugging existing security vulnerabilities. An approach that is used to reimage an ATM may involve physically connecting some external device (e.g., a USB drive) into the ATM. The external device may include a copy of the image, and connecting it to the ATM may allow for the reimaging process to take place. However, an external device has several disadvantages including being subject to physical damage that may render it unable to reimage the ATM as well as being a potential vector for the introduction of viruses or other malicious software that may damage or exploit the ATM.

Further, in some instances the source of the image and/or the provider of the ATM may be a different entity from the entity associated with the ATM (e.g., a bank). In such cases the source of the image and/or the provider of the ATM may enter into a confidentiality agreement (e.g., a proprietary software confidentiality agreement) with the bank. The confidentiality agreement may be used to ensure that the proprietary information (e.g., trade secrets) of the source of the image and/or the provider of the ATM is not revealed when the ATM is reimaged.

SUMMARY

Aspects of the disclosure provide technical solutions to improve the effectiveness with which an ATM may be reimaged and may leverage machine learning models to execute prioritized threads based on the state of the ATM. Further, aspects of the disclosure may be used to improve the reimaging process and resolve technical issues by using a virtual reality interface to access an ATM and perform operations to reimage the ATM.

In accordance with one or more embodiments of the disclosure, a computing system may comprise one or more processors and memory storing computer-readable instructions that, when executed by the one or more processors, may cause the computing system to send, to an authorization computing system, a request for authorization to reimage an automated teller machine (ATM). The computing system may, based on the request for authorization to reimage the ATM being granted, retrieve ATM data that may comprise an indication of a state of the ATM. The computing system may determine, based on inputting the ATM data into one or more machine learning models, a plurality of instructions to reimage the ATM. The computing system may determine, based on inputting the ATM data and the plurality of instructions into the one or more machine learning models: a plurality of amounts of random asynchronous memory (RAM) of the ATM to assign to a plurality of processes corresponding to the plurality of instructions; and a plurality of priorities of executing a plurality of threads corresponding to the plurality of processes. Furthermore, the computing system may reimage the ATM based on execution, in the RAM of the ATM, in accordance with the plurality of priorities, the plurality of threads corresponding to the plurality of processes.

In one or more implementations, the ATM data may comprise an indication of a software version of the ATM, one or more entities authorized to access the ATM, a memory configuration of the ATM, or one or more error codes indicating an issue with the ATM.

In one or more implementations, the computing system may store additional computer-readable instructions that, when executed by the one or more processors, further cause the computing system to: access training data that may comprise a plurality of ATM states of a training ATM; generate, based on inputting the training data into the one or more machine learning models, a plurality of training instructions to reimage the training ATM; determine a similarity between the plurality of training instructions and a plurality of ground-truth training instructions; generate, based on the similarity between the plurality of training instructions and the plurality of ground-truth training instructions, an instruction prediction accuracy of the one or more machine learning models; and adjust a weighting of one or more parameters of the one or more machine learning models based on the instruction prediction accuracy.

In one or more implementations, the computing system may store additional computer-readable instructions that, when executed by the one or more processors, further cause the computing system to: access training data that may comprise a plurality of training instructions to reimage a training ATM; generate, based on inputting the training data into the one or more machine learning models, a plurality of amounts of training RAM of the training ATM to assign to a plurality of training processes; determine a similarity between the plurality of indications of amounts of training RAM and a plurality of indications of ground-truth amounts of training RAM; generate, based on the similarity between the plurality of indications of amounts of training RAM and the plurality of indications of ground-truth amounts of training RAM, a memory apportionment accuracy of the one or more machine learning models; and adjust a weighting of one or more parameters of the one or more machine learning models based on the memory apportionment accuracy.

In one or more implementations, the computing system may store additional computer-readable instructions that, when executed by the one or more processors, further cause the computing system to: access training data that may comprise a plurality of training processes assigned to RAM of a training ATM; generate, based on inputting the training data into the one or more machine learning models, a plurality of training priorities of executing a plurality of training threads corresponding to the plurality of training processes; determine a similarity between the plurality of training priorities and a plurality of ground-truth training priorities; generate, based on the similarity between the plurality of training priorities and the plurality of ground-truth training priorities, a thread prioritization accuracy of the one or more machine learning models; and adjust a weighting of one or more parameters of the one or more machine learning models based on the thread prioritization accuracy.

In one or more implementations, the plurality of threads may be executed in parallel.

In one or more implementations, the ATM data may be encrypted using SHA-256.

In one or more implementations, the data communicated between the computing system, the authorization computing system, and the ATM may be encrypted.

In one or more implementations, the firmware properties of the ATM may be encrypted and stored separately from the ATM data.

In one or more implementations, the computing system may store additional computer-readable instructions to reimage the ATM, that when executed by the one or more processors, further cause the computing system to: determine, for each of the plurality of processes, based on one or more criteria, whether to aggregate a portion of the plurality of processes; and based on meeting the criteria to aggregate one or more of the plurality of processes, generate an aggregated process that may comprise the portion of the plurality of processes.

In one or more implementations, the one or more criteria may comprise the portion of the plurality of processes requiring less than a threshold amount of RAM.

In one or more implementations, the ATM data may be homomorphically encrypted. Further, the one or more machine learning models may be configured to process the ATM data that has been homomorphically encrypted without decrypting the ATM data that has been homomorphically encrypted.

In accordance with one or more embodiments of the disclosure, a computing system may one or more processors; and memory storing computer-readable instructions that, when executed by the one or more processors, cause the computing system to: retrieve credential data that may comprise device credentials of an extended reality device and user credentials of a user of the extended reality device. The computing system may retrieve automated teller machine (ATM) data that may comprise an identifier of an ATM. The computing system may send a request to reimage the ATM to an authorization computing system. The request may comprise the credential data and the ATM data. The authorization computing system may be configured to grant the request based on authentication of the credential data. The computing system may, based on the authorization computing system granting the request to reimage the ATM, generate a virtual environment that may comprise a virtual representation of the ATM that may be configured to cause the ATM to be reimaged based on one or more virtual inputs to reimage the virtual representation of the ATM within the virtual environment. Furthermore, the computing system may, based on detecting one or more virtual inputs to reimage the virtual representation of the ATM, generate one or more instructions to reimage the ATM.

In one or more implementations, the extended reality device may comprise a virtual reality headset, an augmented reality headset, or one or more controller devices that may be configured to generate the one or more virtual inputs based on one or more physical inputs of the user. Further, the extended reality device may be configured to display the virtual environment via one or more display devices of the extended reality device.

In one or more implementations, the user may be represented by an avatar within the virtual environment. Further, the avatar may be configured to convey the one or more virtual inputs based on one or more physical inputs of the user.

In one or more implementations, the virtual representation of the ATM may comprise an interface that displays a virtual representation of ATM data associated with the state of the ATM. Further, the virtual representation of the ATM data may comprise virtual representation of a software version of the ATM, a virtual representation of a memory configuration of the ATM, or a virtual representation of one or more error codes indicating an issue with the ATM.

In one or more implementations, the memory stores additional computer-readable instructions to determine whether the extended reality device may be authorized to reimage the ATM, that when executed by the one or more processors, further cause the computing system to: determine geo-coordinates associated with the extended reality device; and based on the geo-coordinates matching an authorized geo-coordinate, determine that the extended reality device may be authorized to reimage the ATM.

In one or more implementations, granting the request to reimage the ATM may be based on authentication of the credential data or authorization of the extended reality device. Further, authentication of the credential data may comprise use of a non-fungible token (NFT) stored in a secure distributed ledger platform.

In one or more implementations, the credential data may comprise a passcode that may be used to receive authorization to reimage the ATM, a hardware configuration of the extended reality device, a software configuration of the extended reality device, or a location of the extended reality device.

In one or more implementations, the one or more virtual inputs to reimage the ATM comprise one or more virtual inputs to select a virtual representation of an ATM image and input the virtual ATM image into the virtual representation of the ATM In one or more implementations, the credential data or the ATM data may be encrypted using SHA-256.

In one or more implementations, the extended reality device may comprise a smartphone, a tablet, or a laptop computing device. Further, the virtual environment may be generated via a display device of the extended reality device. Further, the one or more virtual inputs may be conveyed via one or more input devices of the extended reality device In one or more implementations, the credential data or the ATM data may be homomorphically encrypted. Further, the extended reality device, the authorization computing system, and the ATM may be configured to process the credential data or the ATM data that has been homomorphically encrypted In one or more implementations, the virtual environment may be a three-dimensional visual environment. Further, the virtual representation of the ATM may comprise a three-dimensional visual representation based on a physical appearance of the ATM.

Corresponding apparatuses, devices, systems, and computer-readable media (e.g., non-transitory computer readable media) are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts an illustrative method for automatically training a machine learning model to generate instructions used to reimage an ATM in accordance with one or more example embodiments;

FIG. 8 depicts an illustrative method for automatically training a machine learning model to generate priorities of threads used to reimage an ATM in accordance with one or more example embodiments.

DETAILED DESCRIPTION

Figure 1:
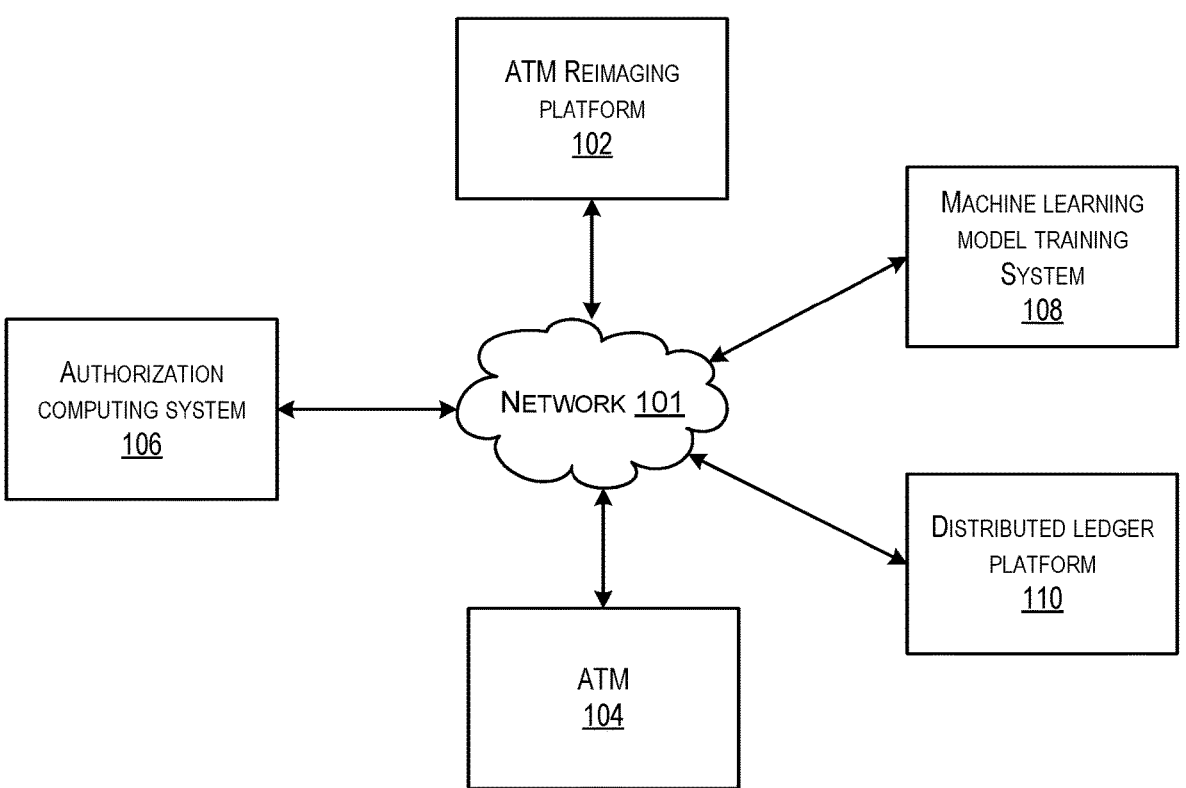
FIG. 1 depicts an illustrative computing environment for automated reimaging of an ATM in accordance with one or more aspects of the disclosure.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Aspects of the disclosed technology may relate to devices, systems, non-transitory computer readable media, and/or methods for reimaging an ATM. The disclosed technology may leverage artificial intelligence, virtual reality, an/or zero trust techniques to reimage an ATM. The use of these techniques may result in a variety of benefits and advantages including a reduction in the time used to reimage the ATM, an improved user interface to reimage an ATM, more efficient use of computational resources achieved through use of machine learning models, and protection of confidential proprietary information. Additionally, reimaging an ATM may be performed on a zero trust basis such that there is continuous verification of encrypted communications between the ATM and the source of the image that is used to reimage the ATM. As a result, the disclosed technology may allow for a wide variety of benefits and advantages that enhance the efficiency of the reimaging process without sacrificing a high-level of security.

The disclosed technology may provide a zero based artificial algorithm based reimaging process that leverages random access memory (RAM) partitioning when reimaging an ATM. The disclosed technology may be used to reimage an ATM by sending a request for authorization to access an ATM. For example, a user may use a computing device (e.g., a virtual reality headset, an augmented reality device, a laptop computing device, and/or a smart device such as a smartphone) to make a request (e.g., a real time request) for access to reimage the ATM. The request to access the ATM may comprise a request to authenticate the identity of the user making the request (e.g., authenticate that the user is a service technician that is authorized to reimage the ATM). The request to access the ATM and/or subsequent data communicated to the ATM may be performed on a variety of networks and/or network architectures. In some embodiments, the data communicated to the ATM may be communicated in a cloud computing environment.

Based on the request for authorization being granted, communication of data between the ATM and a device accessing the ATM may be initiated. Communication with the ATM may be performed on a zero trust basis using zero trust policies in which access to the ATM is verified on an ongoing basis that is not limited to the time of initial authorization. By way of further example, zero trust policies may include continuous verification of user credentials (e.g., authentication and/or authorization of an ATM technician to access and image an ATM) and/or hardware credentials (e.g. VR headset authentication and/or authorization) during a reimaging session, geolocation restrictions to limit remote access to the ATM to specified locations, and/or encryption (e.g., SHA-256 encryption) of data communicated to and from the ATM. In some embodiments, data may be encrypted using homomorphic encryption. The use of homomorphic encryption may result in enhanced privacy by allowing communication with the ATM without having to decrypt the data being communicated. Data retrieved from the ATM may include an indication of one or more software error codes associated with the ATM, one or more hardware error codes associated with the ATM, the software installed on the ATM, the software version installed on the ATM, and/or the hardware specifications (e.g., processor type, memory, network capabilities, and/or storage capacity) of the ATM. The one or more software error codes may indicate software errors associated with the ATM including one or more software functionalities of the ATM that are not working properly (e.g., issues with the ATM's user interface, network transmission errors with the ATM, and/or errors resulting from security issues). The one or more hardware error codes may indicate hardware errors associated with the ATM including one or more hardware functionalities of the ATM that are not working properly (e.g., an electronic or mechanical component of the ATM malfunctioning). Based at least in part on the data retrieved from the ATM, an identifier associated with the ATM may be inputted into one or more machine learning models that may be configured and/or trained to determine an image and/or one or more drivers (e.g., portions of deployable code) that may be used to image or reimage the ATM. The one or more machine learning models may then generate one or more indications of one or more drivers to use to image the secured device. In some embodiments, the data retrieved from the ATM may comprise one or more error codes. The one or more error codes may indicate one or more hardware and/or one or more software errors that have occurred on the ATM.

The computing device may input the one or more indications of the one or more drivers, the one or more error codes, and/or an indication of the identity of the ATM into one or more machine learning models that may be configured and/or trained to generate one or more deployment priorities corresponding to the drivers that may be used to image or reimage the ATM. For example, the one or more machine learning models may comprise a supervised or unsupervised machine learning model that may perform operations including determining an amount of memory of the ATM to apportion to each of the one or more drivers. In some embodiments, a scheduler component of the one or more machine learning models may be used to determine the one or more priorities of the one or more drivers. In some embodiments, one or more drivers of the ATM image may be apportioned to corresponding segments of memory (e.g., RAM) based on the memory requirements of each of the one or more drivers.

The memory (e.g., RAM) may be divided into multiple segments by one or more machine learning models. Further, one or more machine learning models may be configured and/or trained to assign one or more processes to the drivers which may be deployed to reimage the ATM. The ATM may be reimaged based on the one or more processes. Each of the processes may comprise one or more threads that may be executed in parallel and may be used to rapidly image or reimage the ATM.

In some embodiments, any of the operations described herein including accessing the authorization computing device, accessing the ATM, retrieving data (e.g., ATM identifier and/or one or more error codes) from the ATM, imaging the ATM, and/or reimaging the ATM may be performed via a virtual reality (VR) interface and/or augmented reality (AR) interface. For example, a user reimaging an ATM may use a VR headset and/or associated controllers to contact an authorization computing device, and/or ATM in order to remotely access the ATM. The user may then unlock the ATM, re-image the ATM, and/or reboot the machine. In some embodiments, the VR interface may be used to access and/or view a user interface presented to a regular user (e.g., a person withdrawing funds from the ATM) and/or a service interface that is different from the user interface that is presented to a regular user. The service interface may present an authorized user of the VR interface with one or more error codes that may indicate hardware and/or software issues associated with the ATM. Furthermore, the use of a VR or AR interface may facilitate the process of a user reimaging an ATM by providing an interface that is less abstract and more similar to that of an actual physical interaction with the ATM.

FIG. 1 depicts an illustrative computing environment for automated reimaging of an ATM in accordance with one or more aspects of the disclosure. Referring to FIG. 1, computing environment 100 may include one or more computing systems. For example, computing environment 100 may include ATM reimaging platform 102, ATM 104, authorization computing system 106, machine learning model training system 108, and distributed ledger platform 110.

As described further below, ATM reimaging platform 102 may comprise a computing system that includes one or more computing devices (e.g., computing devices comprising one or more processors, one or more memory devices, one or more storage devices, and/or communication interfaces) that may be used to reimage an ATM. For example, the ATM reimaging platform 102 may be configured to implement one or more machine learning models that may be configured and/or trained to receive ATM data from an ATM and determine instructions, processes, and threads that may be executed as part of reimaging the ATM.

Further, ATM reimaging platform 102 may be used to implement an extended reality interface (e.g., a virtual reality or augmented reality interface) that may be used to interact with and reimage the ATM. For example, the ATM reimaging platform 102 may be used to initiate an attempt to access the ATM 104 using an extended reality interface (e.g., a via a virtual reality interface). ATM reimaging platform 102 may be used to implement a virtual reality application that may be used to generate a virtual representation of an environment. The user may send a request to reimage the ATM 104. The request to reimage the ATM 104 may be sent to the authorization computing system 106, which may grant the ATM reimaging platform access to the ATM 104.

In some implementations, the ATM reimaging platform 102 may transmit data (e.g., geocoordinates associated with the ATM reimaging platform 102, a non-fungible token (NFT) that may be used for a unique session between the ATM reimaging platform 102 and ATM 104, an avatar identifier ("avatar id") used to identify an avatar of a user of the ATM reimaging platform 102, and/or a VR identifier ("VR id") used to identify an extended reality device associated with the ATM reimaging platform 102. The data transmitted by the ATM reimaging platform 102 may be transmitted to authorization computing system 106 which may be configured to grant access to the ATM. For example, authorization to reimage the ATM 104 may be restricted to users within a certain geographic region such that a user with geocoordinates outside that geographic region shall not be authorized to reimage the ATM 104. In some implementations, one or more extended reality devices may use biometric authentication to authenticate the identity of the user, which may be used to determine whether the user is authorized to access the ATM 104. Communication between the ATM reimaging platform 102, authorization computing system 106, and/or the ATM may be encrypted and performed using zero trust policies in which communications between devices are encrypted and devices are continuously being authenticated.

The ATM reimaging platform 102 may access one or more computing devices and/or computing systems remotely. For example, the ATM reimaging platform 102 may remotely access the ATM 104 and/or the authorization computing system 106.

ATM 104 may comprise a computing device or computing system that is configured to dispense funds, receive deposits, access account information, display account information, and/or otherwise perform operations to facilitate transactions for a customer. The ATM 104 may be located at a different physical location than the ATM reimaging platform 102 and/or the authorization computing system 106. Although a single ATM 104 is shown, this is for illustrative purposes only, and any number of ATMs may be included in the computing environment 100 without departing from the scope of the disclosure.

Authorization computing system 106 may comprise one or more computing devices and/or one or more computing systems. Each of the one or more computing devices and/or one or more computing systems may comprise one or more processors, one or more memory devices, one or more storage devices, and/or a communication interface that may be used to send and/or receive data and/or perform operations including determining whether to grant access to an ATM (e.g., ATM 104). For example, the authorization computing system 106 may receive, from the ATM reimaging platform 102, a request to access the ATM 104. The request may comprise credential data that the authorization computing system 106 may analyze and use to determine whether to grant access (e.g., access to the ATM 104) to the ATM reimaging platform 102. The credential data may comprise a passcode that may be used to receive authorization to reimage the ATM, a hardware configuration (e.g., a make and model of an extended reality headset) of the extended reality device, a software configuration (e.g., a software version) of the extended reality device, and/or a location (e.g., a geographic location and/or an IP address) of the extended reality device. The credential data and/or the ATM data may be homomorphically encrypted. Further, the extended reality device, the authorization computing system, and/or the ATM may be configured to process the credential data or the ATM data that has been homomorphically encrypted. For example, one or more machine learning models implemented on the ATM reimaging platform 102 may use homomorphically encrypted ATM data to generate instructions to reimage the ATM 104 without deciphering the ATM data. In this way, the confidentiality of proprietary information that may be included in the ATM data may be maintained. In some implementations, firmware properties of the ATM may be encrypted and/or stored separately from the ATM data.

In some implementations, authorization computing system 106 may determine whether an extended reality device is authorized to access and/or be used to reimage the ATM 104. For example, authorization computing system 106 may perform operations including determining geo-coordinates associated with the extended reality device. For example, the authorization computing system 106 may analyze geographic coordinate data sent from an extended reality device associated with the ATM reimaging system. Further, the authorization computing system may, based on the geo-coordinates matching an authorized geo-coordinate, determine that the extended reality device is authorized to reimage the ATM.

Machine learning model training system 108 may comprise a computing system that includes one or more computing devices (e.g., servers, server blades, or the like) and/or other computer components (e.g., one or more processors, one or more memory devices, and/or one or more communication interfaces) that may be used to store training data that may be used to train one or more machine learning models. For example, the machine learning model training system 108 may store training data comprising one or more training instructions for an ATM, training processes for an ATM, and/or training threads executed by an ATM. One or more machine learning models stored and/or trained on the machine learning model training system 108 may include the one or more machine learning models on the ATM reimaging platform 102. Further, the one or more machine learning models of the ATM reimaging platform 102 may be trained and/or updated by the machine learning model training system 108.

Distributed ledger platform 110 may comprise a computing device or computing system that includes one or more computing devices (e.g., servers, server blades, or the like) and/or other computer components (e.g., processors, memories, communication interfaces) that may be used to generate, host, and/or otherwise maintain a distributed ledger (e.g., a blockchain, holochain, and/or other distributed ledger). In some implementations, the distributed ledger platform 110 may communicate with the ATM reimaging platform 102 to authenticate credentials of a device and/or user that is requesting access to the ATM 104.

Computing environment 100 may include one or more networks, which may interconnect the ATM reimaging platform 102, authorization computing system 106, and/or machine learning model training system 108. For example, computing environment 100 may include a network 101

(which may interconnect, e.g., ATM reimaging platform 102, authorization computing system 106, and/or machine learning model training system 108). In some instances, the network 101 may be a 5G data network, and/or other data network.

In one or more arrangements, ATM reimaging platform 102, ATM 104, authorization computing system 106, machine learning model training system 108, and/or distributed ledger platform 110 may comprise any type of computing device capable of sending and/or receiving data and processing the data accordingly. For example, ATM reimaging platform 102, ATM 104, authorization computing system 106, machine learning model training system 108, distributed ledger platform 110, and/or the other systems included in computing environment 100 may, in some instances, include server computers, desktop computers, laptop computers, tablet computers, smart phones, or the like that may include one or more processors, one or more memory devices, communication interfaces, one or more storage devices, and/or other components. As noted above, and as illustrated in greater detail below, any combination of ATM reimaging platform 102, authorization computing system 106, machine learning model training system 108, and/or distributed ledger platform 110, may, in some instances, be special-purpose computing devices configured to perform specific functions. For example, ATM reimaging platform 102 may comprise one or more application specific integrated circuits (ASICs) that are configured to process ATM data, implement one or more machine learning models, implement a virtual environment (e.g., a virtual reality environment), image an ATM, and/or reimage an ATM.

Figure 2:
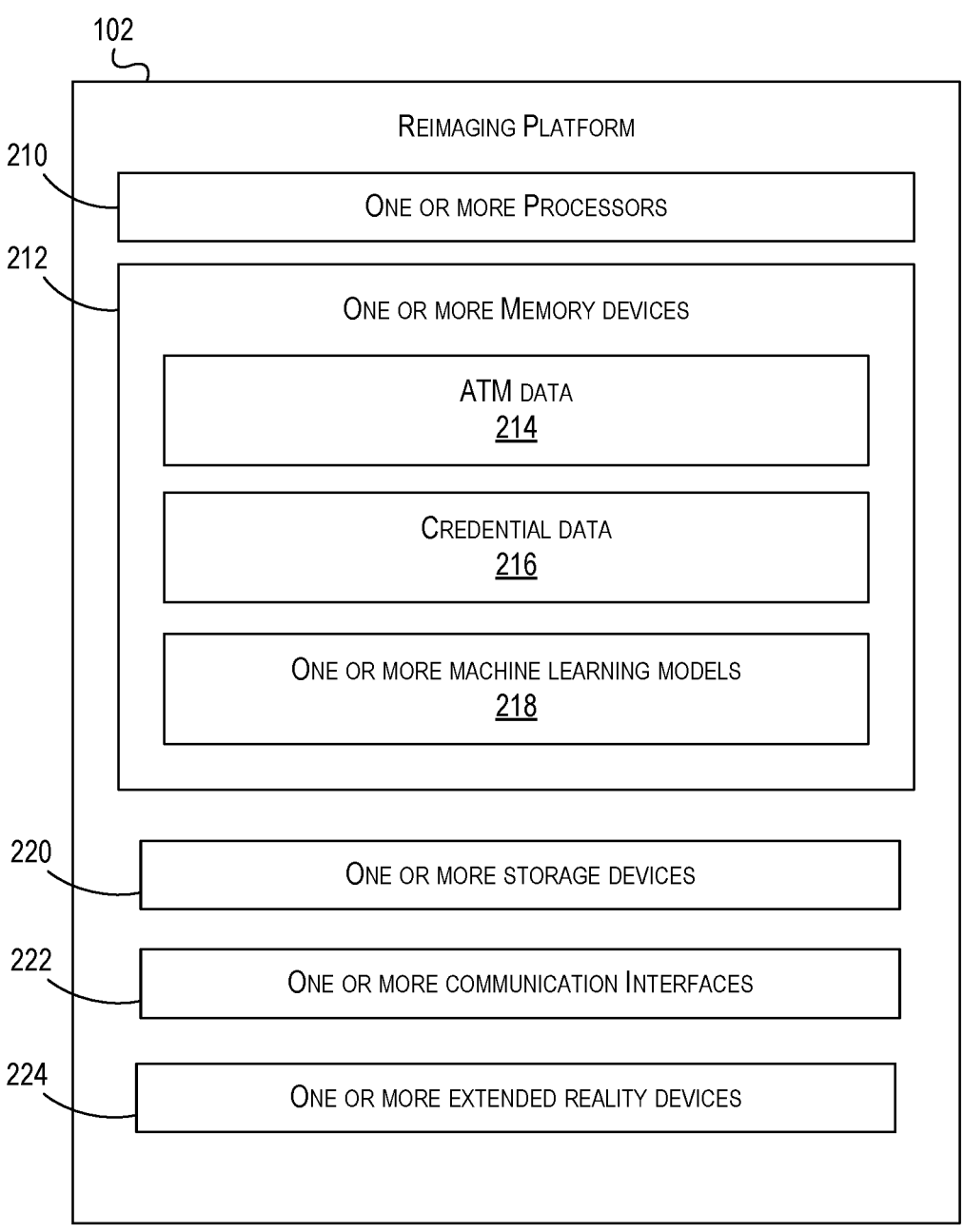
FIG. 2 depicts an illustrative computing platform for automated reimaging of an ATM in accordance with one or more aspects of the disclosure.

FIG. 2 depicts an illustrative computing platform for automated reimaging of an ATM in accordance with one or more aspects of the disclosure. ATM reimaging platform 102 may include one or more processors (e.g., processor 210), one or more memory devices 212, and a communication interface (e.g., one or more communication interfaces 222). A data bus may interconnect the processor 210, one or more memory devices 212, one or more storage devices 220, and/or one or more communication interfaces 222. One or more communication interfaces 222 may be configured to support communication between ATM reimaging platform 102 and one or more networks (e.g., network 101, or the like). One or more communication interfaces 222 may be communicatively coupled to the one or more processor 210. The memory may include one or more program modules having instructions that when executed by one or more processor 210 cause the ATM reimaging platform 102 to perform one or more functions described herein and/or one or more databases that may store and/or otherwise maintain information which may be used by such program modules and/or one or more processors 210. The one or more memory devices 212 ma comprise RAM. In some instances, the one or more program modules and/or databases may be stored by and/or maintained in different memory units of ATM reimaging platform 102 and/or by different computing devices that may form and/or otherwise make up ATM reimaging platform 102. For example, the memory may have, host, store, and/or include ATM data 214, credential data 216, and/or one or more machine learning models 218. One or more storage devices 220 (e.g., solid state drives and/or hard disk drives) may also be used to store data including the ATM data. The one or more storage devices 220 may comprise non-transitory computer readable media that may store data when the one or more storage devices 220 are in an active state (e.g., powered on) or an inactive state (e.g., sleeping or powered off).

ATM data 214 may comprise ATM data indicating the state of an ATM (e.g., ATM 104). Credential data 216 may comprise information indicating credentials for a computing device and/or a user of a computing device. For example, the credential data 216 may comprise a passcode that a user may use to access an ATM, a hardware identifier of a computing device that is authorized to access, image, and/or reimage an ATM (e.g., an extended reality device identifier), and/or software information indicating a version of software and/or whether the software has the most recent security patches installed. One or more machine learning models 218 may implement, refine, train, maintain, and/or otherwise host an artificial intelligence model that may be used to process, analyze, evaluate, and/or validate data including ATM data as described herein. Further, one or more machine learning models 218 may comprise one or more instructions that direct and/or cause the ATM reimaging platform 102 to access ATM data 214 and/or perform other functions. Further, one or more machine learning models 218 may comprise a machine learning model that comprises one or more instructions to reimage an ATM as described herein.

One or more extended reality devices 224 may comprise one or more virtual reality devices, one or more augmented reality devices, and/or one or more controllers that may be configured to receive user input and generate one or more virtual outputs that may be detected in a virtual environment. The one or more virtual inputs may be based on one or more physical inputs of a user (e.g., a user's hand gesture may cause a virtual input within a virtual environment). A user may be represented by an avatar within the virtual environment. Further, the avatar may be configured to convey the one or more virtual inputs based on one or more physical inputs of the user. For example, a user avatar may comprise virtual hands that may be used to interact with various objects within a virtual environment. Further, the one or more extended reality devices may be configured to display a virtual environment via one or more display devices of the extended reality device (e.g., one or more monitors mounted in an extended reality headset). The one or more extended reality devices 224 may comprise one or more cameras that may track movements of a user including eye movements (e.g., eye tracking), gestures, facial expressions, hand movements (e.g., pointing, clicking, and/or selecting virtual objects in a virtual environment), and/or head movements (e.g., nodding). Further, the one or more extended reality devices 224 may comprise one or more audio output devices that may generate sounds associated with a virtual environment. In some implementations, the one or more extended reality devices 224 may comprise a smartphone, a tablet, and/or a laptop computing device. Further, a virtual environment may be generated via a display device of the extended reality device (e.g., a smartphone display). Further, one or more virtual inputs may be conveyed via one or more input devices (e.g., a keyboard or touchscreen) of the extended reality device.

Figure 3:
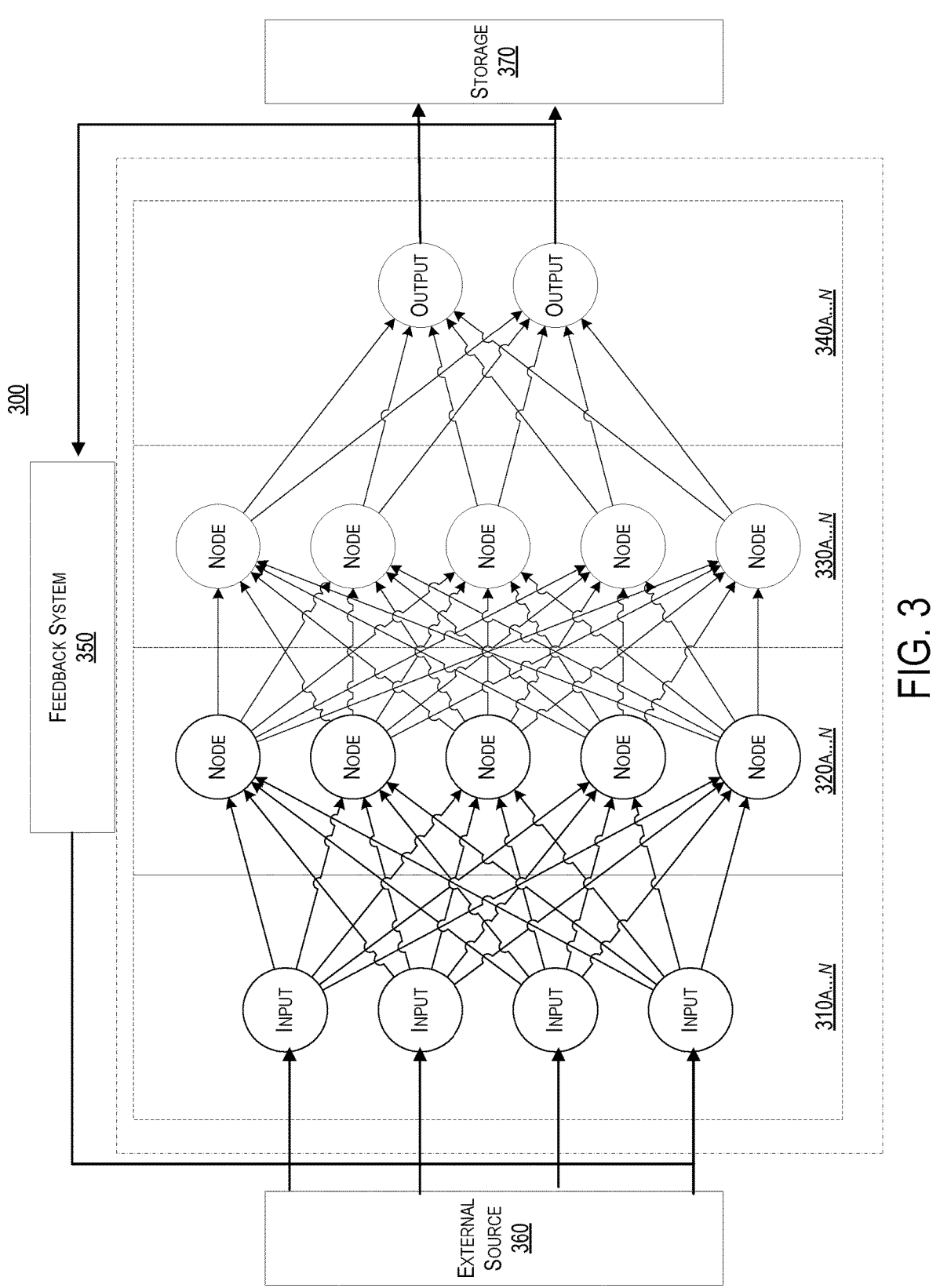
FIG. 3 depicts nodes of an illustrative artificial neural network on which a machine learning algorithm may be implemented in accordance with one or more aspects of the disclosure.

FIG. 3 depicts nodes of an illustrative artificial neural network on which a machine learning algorithm may be implemented in accordance with one or more aspects of the disclosure. In FIG. 3, each of input nodes 310*a-n* may be connected to a first set of processing nodes 320*a-n*. Each of the first set of processing nodes 320*a-n* may be connected to each of a second set of processing nodes 330*a-n*. Each of the second set of processing nodes 330*a-n* may be connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to storage 370. The feedback system 350 may send output to the input nodes 310*a-n* for successive processing iterations with the same or different input data.

In one illustrative method using feedback system 350, the system may use machine learning to determine an output. The output may include instructions (e.g., instructions to image or reimage an ATM), memory apportionment output (e.g., indications of amounts of memory to assign to processes), thread priority output (e.g., indications of priorities for threads), regression output, confidence values, and/or classification output. The system may use any machine learning model including one or more generative adversarial networks (GANs), XGBoosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310a-n may comprise logical inputs of different data sources, such as one or more data servers. The processing nodes 320a-n may comprise parallel processes executing on multiple servers in a data center. And, the output nodes 340a-n may be the logical outputs that ultimately are stored in results data stores, such as the same or different data servers as for the input nodes 310a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310a-n may be processed through processing nodes, such as the first set of processing nodes 320a-n and the second set of processing nodes 330a-n. The processing may result in output in output nodes 340a-n. As depicted by the connections from the first set of processing nodes 320a-n and the second set of processing nodes 330a-n, processing may comprise multiple steps or sequences. For example, the first set of processing nodes 320a-n may be a rough data filter, whereas the second set of processing nodes 330a-n may be a more detailed data filter.

The artificial neural network 300 may be configured to effectuate decision-making. As a simplified example for the purposes of explanation, the artificial neural network 300 may be configured to generate instructions (e.g., instructions to image or reimage an ATM), memory apportionment output (e.g., indications of amounts of memory to assign to processes), thread priority output (e.g., indications of priorities for threads). The input nodes 310a-n may be provided with ATM data that is based on one or more states of an ATM. The first set of processing nodes 320a-n may be each configured to perform specific steps to analyze the ATM data, such as determining instructions that may be used to perform operations to reimage an ATM. The second set of processing nodes 330a-n may be each configured to analyze the instructions and/or RAM of the ATM in order to assign process to memory and prioritize threads. Multiple subsequent sets may further refine this processing, each looking for further more specific tasks, with each node performing some form of processing which need not necessarily operate in the furtherance of that task. The artificial neural network 300 may then execute or cause to be executed a plurality of threads that may be used to reimage an ATM.

The feedback system 350 may be configured to determine the accuracy of the artificial neural network 300. Feedback may comprise an indication of similarity between the value of an output generated by the artificial neural network 300 and a ground-truth value. For example, in the ATM data analysis example provided above, the feedback system 350 may be configured to determine an average accuracy thread prioritization values that are generated for multiple portions of ATM data. The feedback system 350 may already have access to the ground-truth data (e.g., optimized thread prioritization using known processes), such that the feedback system may train the artificial neural network 300 by indicating the accuracy of the output generated by the artificial neural network 300. The feedback system 350 may comprise human input, such as an administrator telling the artificial neural network 300 whether it made a correct decision. The feedback system may provide feedback (e.g., an indication of whether the previous output was correct or incorrect) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to analyze and validate ATM data, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Additionally or alternatively, the node may be reconfigured to process ATM data differently. The modifications may be predictions and/or guesses by the artificial neural network 300, such that the artificial neural network 300 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 300 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning.

In some implementations, the artificial neural network 300 may receive input including one or more input features. The one or more input features may comprise information associated with a symbol rate, roll-off, launch power, channel load, dispersion, nonlinearity, loss, span count, span length, noise figure, and/or channel grid. The machine learning model may be used to generate an output feature comprising a modulation classification. The modulation classification may comprise dual polarization 2 quadrature amplitude modulation (DP-2 QAM), DP-4 QAM, DP-16 QAM, and/or DP-64 QAM. The modulation classification may be used to determine processes (e.g., ATM driver processes) to assign to memory (e.g., RAM of an ATM). Further, as part of causing an ATM to be imaged and/or reimaged, the artificial neural network 300 may schedule the execution of one or more threads of the processes assigned to the RAM.

In some embodiments, artificial neural network 300 may be configured and/or trained to determine the apportionment of memory based on input features including a channel grid and/or span count of the RAM of an ATM. Further, artificial neural network 300 may comprise a collection pointer component which may be used as an aggregator and/or reconciler for the threads that are executed as part of imaging and/or reimaging an ATM. The use of an aggregator and/or reconciler may be used to ensure that the processes necessary to reimage the ATM are executed. In some implementations, artificial neural network 300 may be used to implement a preparation and build orchestration program that manages an end to end (e.g., E2E) deployment procedure associated with imaging and/or reimaging the ATM.

Figure 4:
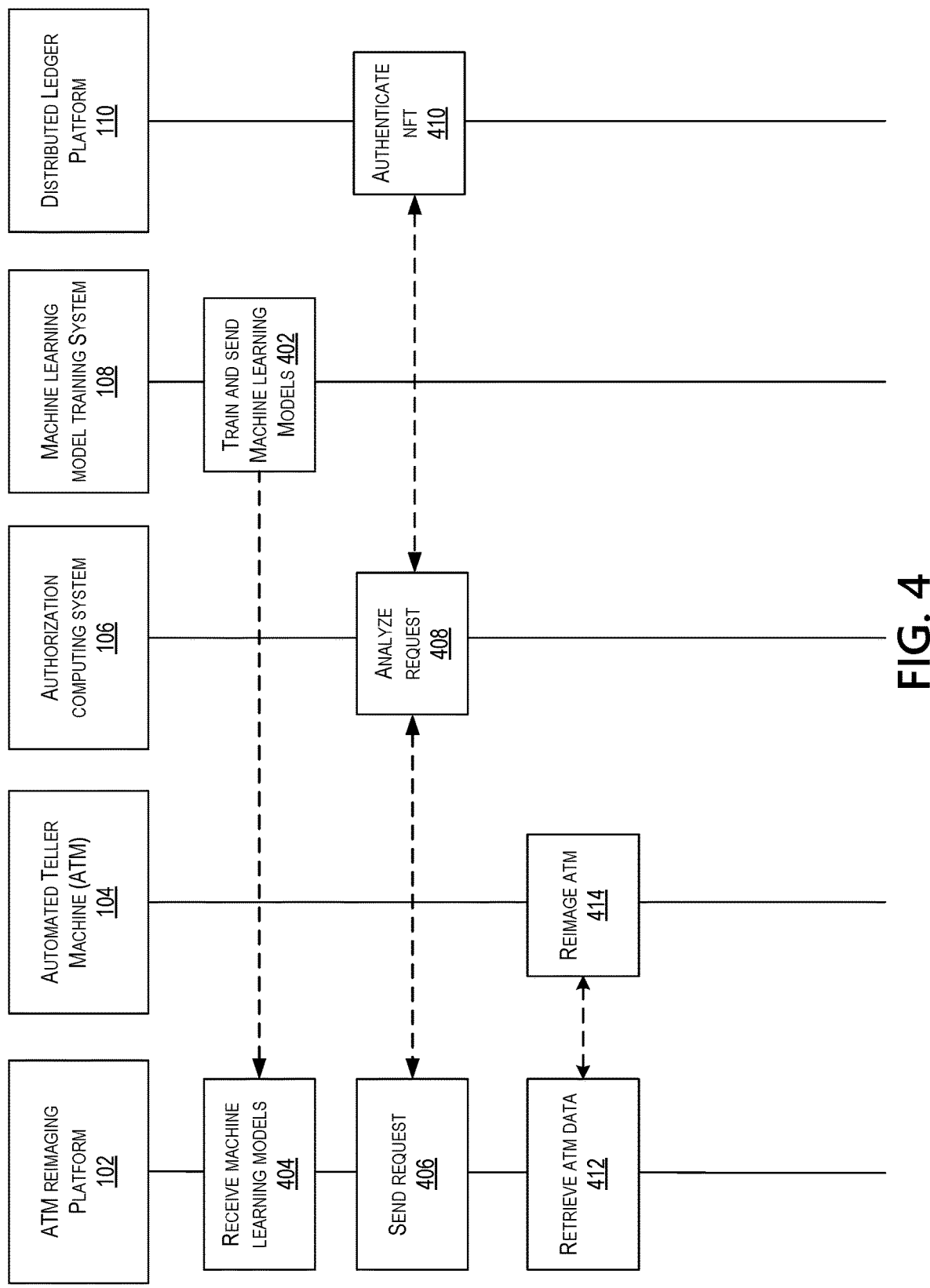
FIG. 4 depicts an illustrative event sequence for automated reimaging of an ATM in accordance with one or more example embodiments.

FIG. 4 depicts an illustrative event sequence for automated reimaging of an ATM in accordance with one or more example embodiments. Referring to FIG. 4, at step 402, a connection may be established between ATM reimaging platform 102 and the machine learning model training system 108. For example, the ATM reimaging platform 102 may establish a data connection with the machine learning model training system 108 to in order to receive an updated copy of one or more machine learning models (e.g., the one or more machine learning models 218 that is described with respect to FIG. 2 and/or the artificial neural network 300 that is described with respect to FIG. 3) that may be used to reimage the ATM 104. In some instances, the machine learning model training system 108 may determine whether the ATM reimaging platform 102 has an updated copy of the one or more machine learning models and may send an indication to the ATM reimaging platform 102 if an update is not warranted.

At step 404, the ATM reimaging platform 102 may receive the one or more machine learning models and perform an update of the one or more machine learning models stored on the ATM reimaging platform 102 is an update is warranted. At step 406, the ATM reimaging platform 102 may send a request to reimage the ATM 104 to the authorization computing system 106. The request may comprise a non-fungible token (NFT) that may be used to authenticate the ATM reimaging platform 102. The authorization computing system may receive the request at step 408 and may analyze the request to determine whether authorization to reimage the ATM 104 may be granted. The authorization computing system 106 may access distributed ledger platform 110. Further, authorization computing system 106 may use the distributed ledger platform 110 to determine whether the NFT in the request is valid. Based on the authorization computing system 106 determining that the request from the ATM reimaging platform 102 is valid, the authorization computing system 106 may grant the request to reimage the ATM 104. Based on the request being granted by the authorization computing system 106, the ATM reimaging platform 102 may access the ATM 104. In some embodiments, the ATM reimaging platform 102 may implement an extended reality interface to allow a user to perform operations to reimage the ATM 104. At step 414, based on data received from the ATM reimaging platform 102, the ATM 104 may be reimaged.

Figure 5:
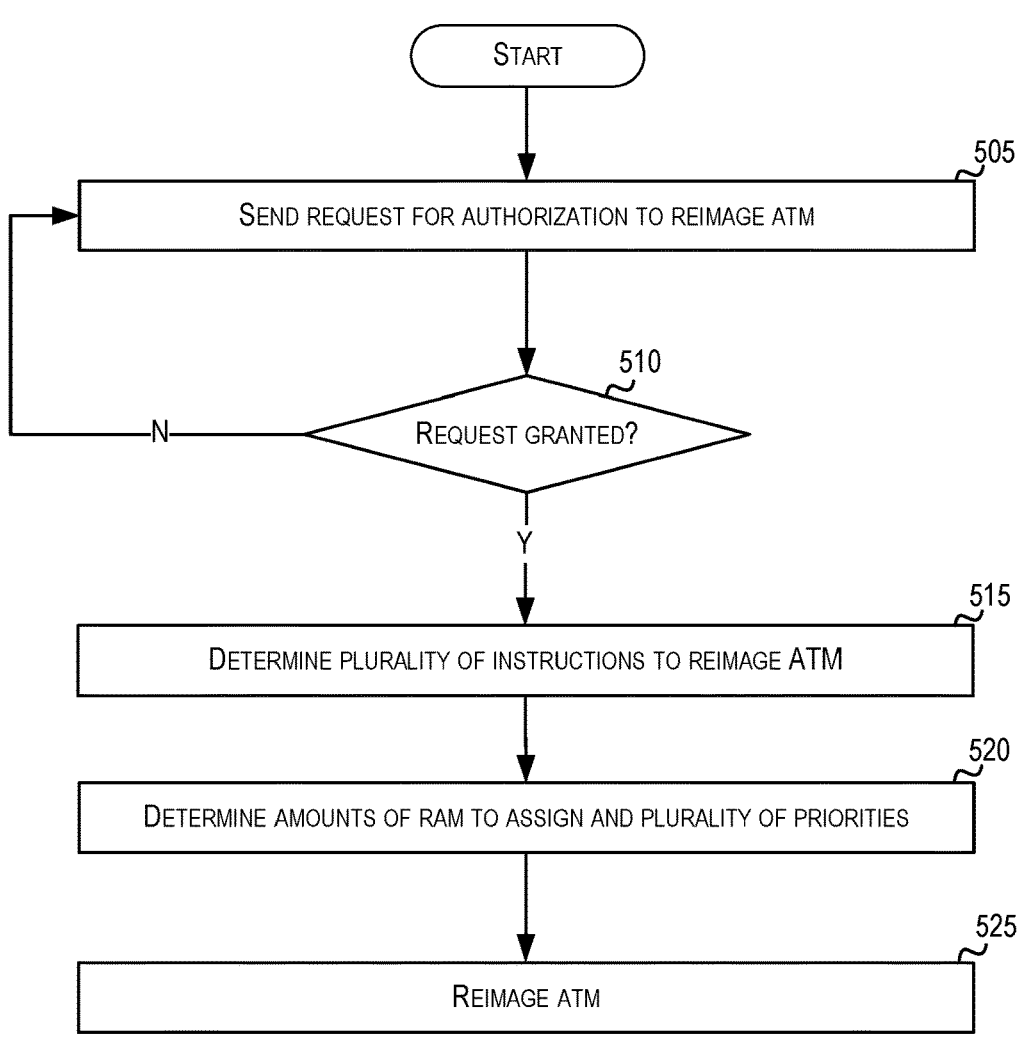
FIG. 5 depicts an illustrative method for automatically reimaging an ATM in accordance with one or more example embodiments.

FIG. 5 depicts an illustrative method for automatically reimaging an ATM in accordance with one or more example embodiments. The steps of a method 500 for automatically reimaging an ATM may be implemented by a computing device or computing system (e.g., the ATM reimaging platform 102) in accordance with the computing devices and/or computing systems described herein.

At step 505, a computing system may send a request for authorization to reimage an automated teller machine (ATM). The request may be sent to an authorization computing system. For example, a computing system (e.g., the ATM reimaging platform 102) may send a request to the authorization computing system 106). The request may comprise an indication of the ident At step 510, the computing system may, based on the request for authorization to reimage the ATM being granted, may perform step 515. For example, a computing system (e.g., the ATM reimaging platform 102) may receive an indication from the authorization computing system 106 that indicates that the request was granted. Based on the request not being granted, step 505 may be performed. For example, a computing system (e.g., the authorization computing system 106) may analyze the request and determine that the request is not authentic and/or that the entity associated with the request is not authorized to access and/or reimage the ATM 104.

At step 515, a computing system may determine, based on inputting the ATM data into one or more machine learning models, a plurality of instructions to reimage the ATM. For example, the ATM reimaging platform 102 may input the ATM data into one or more machine learning models 218, which may be configured and/or trained to generate and/or determine the plurality of instructions to reimage the ATM.

At step 520, a computing system may determine, based on inputting the ATM data and the plurality of instructions into the one or more machine learning models a plurality of amounts of random asynchronous memory (RAM) of the ATM to assign to a plurality of processes corresponding to the plurality of instructions and/or a plurality of priorities of executing a plurality of threads corresponding to the plurality of processes. For example, the ATM reimaging platform 102 may input the ATM data and/or the plurality of instructions into one or more machine learning models 218, which may comprise a machine learning model that is configured and/or trained to generate and/or determine the plurality of amounts of RAM and/or the plurality of priorities. The plurality of amounts of RAM may comprise specific amounts of RAM to assign to specific processes. The plurality of priorities may comprise a rank or priority that is assigned to each of the plurality of threads, such that higher rank or higher priority threads are executed before lower rank or lower priority threads.

At step 525, a computing system may reimage the ATM. Reimaging the ATM may be based on execution, in the RAM of the ATM, in accordance with the plurality of priorities, the plurality of threads corresponding to the plurality of processes. For example, a computing system (e.g., the ATM reimaging platform 102) may perform operations to reimage the ATM 104 such that higher priority threads are executed before lower priority threads.

In some implementations, the computing system may determine, for each of the plurality of processes, based on one or more criteria, whether to aggregate a portion of the plurality of processes. The one or more criteria may comprise the portion of the plurality of processes requiring less than a threshold amount of RAM and/or a number of the plurality of processes being less than a threshold number of processes. Further, based on meeting the criteria to aggregate one or more of the plurality of processes, the computing system may generate an aggregated process comprising the portion of the plurality of processes. Aggregating processes may reduce an amount of time that is used to reimage the ATM.

FIG. 6 depicts an illustrative method for automatically training a machine learning model to generate instructions used to reimage an ATM in accordance with one or more example embodiments. The steps of a method 600 for automatically training a machine learning model may be implemented by a computing device or computing system (e.g., the machine learning model training system 108 and/or the ATM reimaging platform 102) in accordance with the computing devices and/or computing systems described herein.

At step 605, a computing system may access training data. The training data may comprise a plurality of ATM states of a training ATM. For example, the training data may be stored in the machine learning model training system 108, which may be configured to access the training data. In some implementations, accessing the training data may be based on a request to access training data in order to train and/or retrain a machine learning model.

At step 610, a computing system may generate a plurality of training instructions to reimage the training ATM. Generating the plurality of training instructions may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of ATM states and generating a plurality of training instructions that corresponds to the plurality of ATM states. For example, the ATM states may comprise an error message indicating that a particular component of the ATM's software is corrupted. Based on analyzing the error message the one or more machine learning models may generate a training instruction that replaces the component of the ATM's software that is corrupted with a non-corrupted copy.

At step 615, a computing system may determine similarities between the plurality of training instructions and a plurality of ground-truth training instructions. For example, the machine learning model training system may compare a training instruction indicating replacement of a corrupted component of ATM software with a non-corrupted copy to a ground-truth training instruction that correctly indicates the appropriate training instruction. If the training instruction and the ground-truth training instruction are the same then the similarity is high, if the training instruction is different from the ground-truth training instruction the similarity may be based on an extent to which the training instruction generated by the one or more machine learning model is able to achieve a similar result to the ground-truth training instruction.

At step 620, a computing system may determine an instruction prediction accuracy of the one or more machine learning models. Determination of the instruction prediction accuracy may be based on an amount and/or quality of differences (e.g., an extent to which a training instruction achieves the same result as a ground-truth training instruction) between the plurality of training instructions and the plurality of ground-truth training instructions. The instruction prediction accuracy may be positively correlated with the similarity between training instructions and ground-truth training instructions.

At step 625, a computing system may adjust a weighting of one or more parameters of the one or more machine learning models based on the instruction prediction accuracy. For example, the machine learning model training system 108 may increase the weight of the one or more parameters that were determined to increase the instruction prediction accuracy and decrease the weight of the one or more parameters that were determined to decrease the instruction prediction accuracy.

Figure 7:
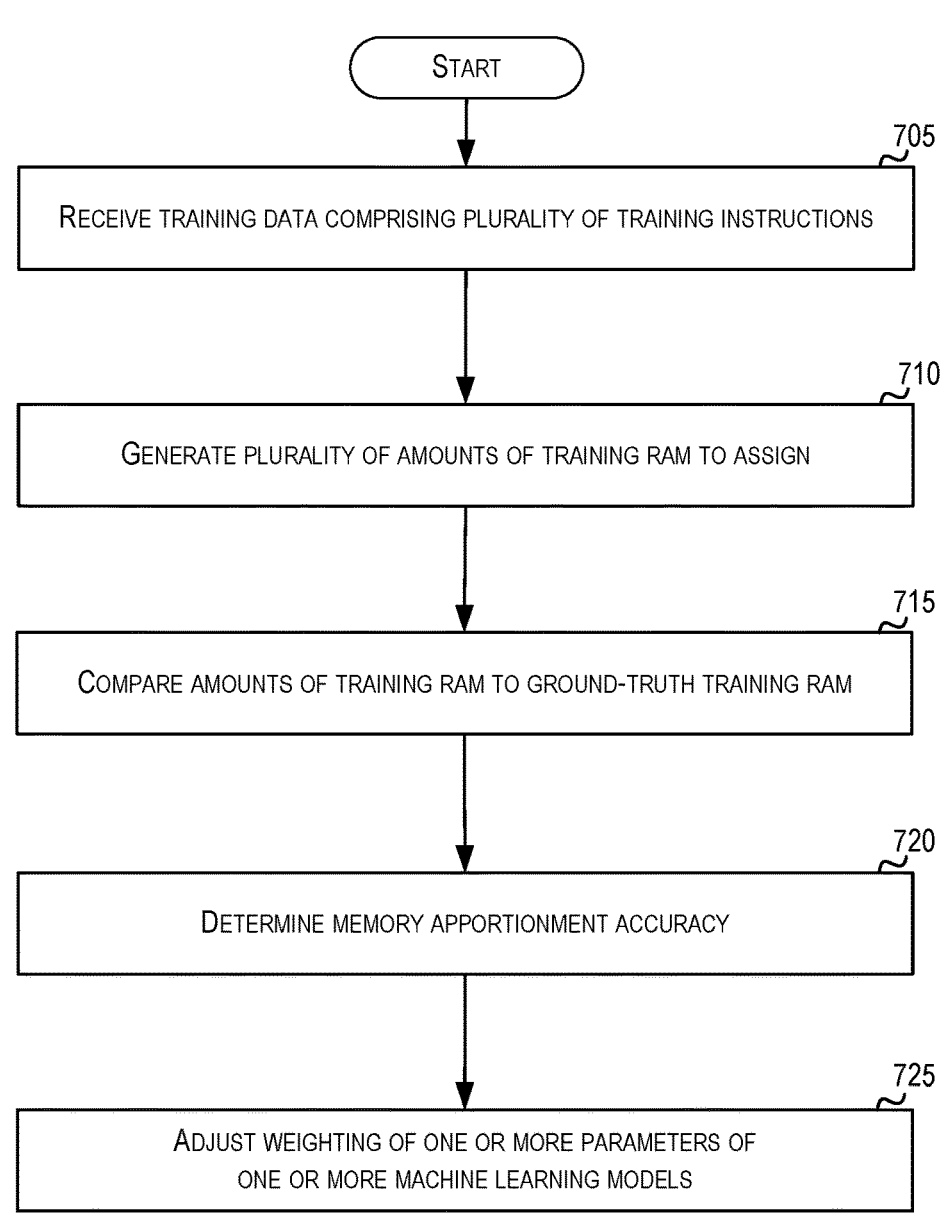
FIG. 7 depicts an illustrative method for automatically training a machine learning model to generate indications of amount of RAM used to reimage an ATM in accordance with one or more example embodiments.

FIG. 7 depicts an illustrative method for automatically training a machine learning model to generate indications of amount of RAM used to reimage an ATM in accordance with one or more example embodiments. The steps of a method 700 for automatically reimaging an ATM may be implemented by a computing device or computing system (e.g., the ATM reimaging platform 102) in accordance with the computing devices and/or computing systems described herein.

At step 705, a computing system may access training data. The training data may comprise a plurality of training instructions to reimage a training ATM. For example, the training data may be stored in the machine learning model training system 108, which may be configured to access the training data. In some implementations, accessing the training data may be based on a request to access training data in order to train and/or retrain a machine learning model.

At step 710, a computing system may generate a plurality of indications of amounts of training RAM of the training ATM to assign to a plurality of training processes. Generating the plurality of indications of amounts of training RAM of the training ATM to assign to a plurality of training processes may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of training instructions and generating a plurality of indications of amounts of training RAM of the training ATM to assign to a plurality of training processes. For example, the plurality of training instructions may require a particular amount of RAM to be instantiated. Based on analyzing the amount of available RAM in the training ATM the one or more machine learning models may generate a plurality of indications of amounts of training RAM that corresponds to the amount of RAM that is available.

At step 715, a computing system may determine similarities between the plurality of indications of amounts of training RAM and a plurality of ground-truth indications of amounts of training RAM. For example, the machine learning model training system may compare a plurality of indications of amounts of training RAM to a plurality of ground-truth indications of amounts of training RAM that correctly indicates the appropriate amounts of training RAM. If the plurality of indications of amounts of training RAM and a plurality of ground-truth indications of amounts of training RAM are the same then the similarity may be high, if the plurality of indications of amounts of training RAM are different from the plurality of ground-truth indications of amounts of training RAM the similarity may be based on a magnitude of the difference in the amount of RAM between the plurality of indications of amounts of training RAM and the plurality of ground-truth indications of amounts of training RAM.

At step 720, a computing system may determine an memory apportionment accuracy of the one or more machine learning models. Determination of the memory apportionment accuracy may be based on an extent to which indicated amounts of training RAM are similar to a ground-truth amount of training RAM. The memory apportionment accuracy may be positively correlated with the similarity between the indications of the amounts of training RAM and the ground-truth indications of amounts of training RAM.

At step 725, a computing system may adjust a weighting of one or more parameters of the one or more machine learning models based on the memory apportionment accuracy. For example, the machine learning model training system 108 may increase the weight of the one or more parameters that were determined to increase the memory apportionment accuracy and decrease the weight of the one or more parameters that were determined to decrease the memory apportionment accuracy.

FIG. 8 depicts an illustrative method for automatically training a machine learning model to generate priorities of threads used to reimage an ATM in accordance with one or more example embodiments. The steps of a method 800 for automatically reimaging an ATM may be implemented by a computing device or computing system (e.g., the ATM reimaging platform 102) in accordance with the computing devices and/or computing systems described herein.

At step 805, a computing system may access training data. The training data may comprise a plurality of training processes assigned to RAM of a training ATM. For example, the training data may be stored in the machine learning model training system 108, which may be configured to access the training data. In some implementations, accessing the training data may be based on a request to access training data in order to train and/or retrain a machine learning model.

At step 810, a computing system may generate a plurality of training priorities of executing a plurality of training threads corresponding to the plurality of training processes to reimage the training ATM. Generating the plurality of training priorities may be based on inputting the training data into the one or more machine learning models. The one or more machine learning models may comprise the features and/or capabilities of machine learning models described herein including the machine learning models described with respect to FIG. 3. For example, training data may be inputted into one or more machine learning models that are implemented on the machine learning model training system 108. The one or more machine learning models of the machine learning model training system 108 may be configured to receive the training data and perform one or more operations including analyzing the plurality of training processes assigned to RAM and generate a plurality of training priorities of executing a plurality of training threads corresponding to the plurality of training processes that corresponds to the plurality of training processes assigned to RAM. For example, the plurality of training processes assigned to RAM may include one or more corresponding threads that may reduce the time to reimage the ATM if scheduled to be executed earlier that most of the other threads. Based on analyzing the plurality of training processes the one or more machine learning models may generate a plurality of training priorities that reduces the time to reimage the training ATM.

At step 815, a computing system may determine similarities between the plurality of training priorities of executing a plurality of training threads corresponding to the plurality of training processes and a plurality of ground-truth training priorities. For example, the machine learning model training system may compare an order of executing the plurality of training threads generated by the one or more machine learning models to an order of executing the plurality of training threads based on the plurality of ground-truth training priorities. If the order generated by the one or more machine learning models and the order based on the plurality of ground-truth training priorities are the same then the similarity may be determined to be high, if the order generated by the one or more machine learning models and the order based on the plurality of ground-truth training priorities is different, the similarity may be based on an extent to which the ground-truth based order and the order generated by the one or more machine learning models are the same.

At step 820, a computing system may determine an thread prioritization accuracy of the one or more machine learning models. Determination of the thread prioritization accuracy may be based on an extent to which prioritization of the plurality of training threads is similar to the ground-truth prioritization of the plurality of training threads. The thread prioritization accuracy may be positively correlated with the similarity between the prioritization of the plurality of training threads and the ground-truth prioritization of the plurality of training threads.

At step 825, a computing system may adjust a weighting of one or more parameters of the one or more machine learning models based on the thread prioritization accuracy. For example, the machine learning model training system 108 may increase the weight of the one or more parameters that were determined to increase the thread prioritization accuracy and decrease the weight of the one or more parameters that were determined to decrease the thread prioritization accuracy.

Figure 9:
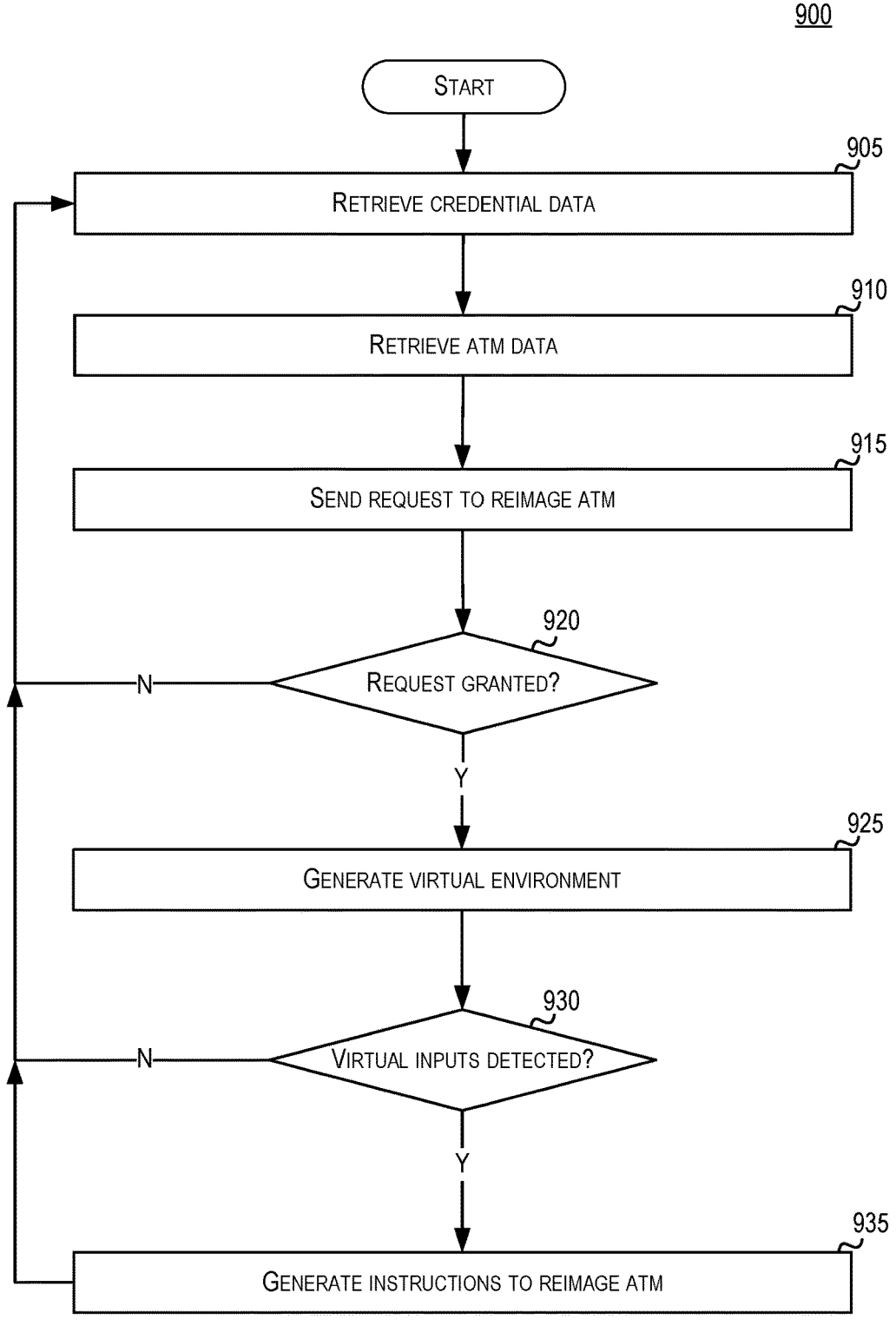
FIG. 9 depicts an illustrative method for using an extended reality interface to access and reimage an ATM in accordance with one or more example embodiments.

FIG. 9 depicts an illustrative method for using an extended reality interface to access and reimage an ATM in accordance with one or more example embodiments. The steps of a method 900 for automatically reimaging an ATM may be implemented by a computing device or computing system (e.g., the ATM reimaging platform 102) in accordance with the computing devices and/or computing systems described herein.

At step 905, a computing system may retrieve credential data comprising device credentials of an extended reality device and user credentials of a user of the extended reality device. For example, a computing system (e.g., the ATM reimaging platform 102) may retrieve credential data comprising user credentials associated with a user of the extended reality device (e.g., an ATM technician's unique employee identifier), a hardware identifier (e.g., a virtual reality device identifier) that identifies the extended reality device, a software identifier that identifies the software running on the extended reality device, an avatar identifier that identifies an avatar used by a user of the extended reality device.

At step 910, a computing system may retrieve automated teller machine (ATM) data comprising an identifier of an ATM. For example, the ATM reimaging platform 102 may retrieve an identifier for an ATM 104 that is scheduled to have it's software updated. the identifier may uniquely identify (e.g., a unique alphanumeric identifier) an ATM and may comprise information associated with a make, model, and/or location of the ATM.

At step 915, a computing system may send a request to reimage the ATM to an authorization computing system. The request may comprise the credential data and/or the ATM data. The authorization computing system may be configured to grant the request based on a determination that the credential data is authentic and/or a determination that the extended reality device is authorized to reimage the ATM. For example, a computing system (e.g., the ATM reimaging platform 102) may send a request comprising the credential data and/or the ATM data to the authorization computing system 106).

At step 920, based on the request for authorization to reimage the ATM being granted, perform step 925. For example, a computing system (e.g., the ATM reimaging platform 102) may receive an indication from the authorization computing system 106 that indicates that the request was granted. Based on the request not being granted, step 905 may be performed. For example, a computing system (e.g., the authorization computing system 106) may analyze the request and determine that the request is not authentic and/or that the entity associated with the request is not authorized to access and/or reimage the ATM 104.

At step 925, a computing system may generate a virtual environment. The virtual environment may comprise a virtual representation of the ATM that is configured to cause the ATM (e.g., the actual physical ATM in the real non-virtual world) to be reimaged based on one or more virtual inputs to reimage the virtual representation of the ATM within the virtual environment. For example, the virtual environment that is a three-dimensional visual representation of an office. Further, a virtual environment may comprise a three-dimensional visual representation of the ATM that appears like an actual physical ATM. The virtual representation of the ATM may be interacted with in a manner similar to that of an actual physical ATM (e.g., customer facing transactions may be performed and/or a troubleshooting console interface of the ATM that indicates one or more error codes of an ATM may be accessed). Further, the virtual representation of the ATM may be configured to respond to virtual inputs in a way that an actual physical ATM would respond to physical inputs. For example, one or more virtual inputs may be used to perform transactions and/or interact with the troubleshooting console on the virtual representation of the ATM. In some implementations, the virtual representation may generate one or more sounds including sounds based on one or more virtual inputs directed to the virtual representation of the ATM.

The virtual representation of the ATM may comprise an interface that displays a virtual representation of ATM data associated with the state of the ATM. For example, the virtual representation of the ATM may comprise a virtual representation of a software version of the ATM on a screen of the virtual representation of the ATM, a virtual representation of a memory configuration of the ATM (e.g., a numeric value indicating available RAM), and/or a virtual representation of one or more error codes indicating an issue with the ATM.

At step 930, a computing system may, based on detecting one or more virtual inputs to reimage the virtual representation of the ATM, perform step 935. For example, a computing system (e.g., the ATM reimaging platform 102) may comprise one or more physical controllers (e.g., one or more handheld motion sensitive controllers that may include a button that may be pressed to click on surfaces or grasp virtual objects within a virtual environment) that a user may use to generate one or more virtual inputs within the virtual environment. The user may provide one or more virtual inputs in which the user uses virtual hands corresponding to the one or more physical controllers to insert a virtual ATM image into the virtual representation of the ATM. The ATM reimaging platform 102 may detect the one or more virtual inputs and cause reimaging of the ATM 104. Based on one or more virtual inputs not being detected, the computing system may wait for some predetermined amount of time (e.g., five minutes) and end the session within the virtual environment and return to step 905.

At step 935, a computing system may generate one or more instructions to reimage the ATM. For example, the ATM reimaging platform 102 may input the ATM data and/or the plurality of instructions into one or more machine learning models 218, which may comprise a machine learning model that is configured and/or trained to generate and/or determine instructions that may be used to reimage the ATM 104. Further, the ATM reimaging platform 102 may determine an apportionment of processes to RAM of the ATM 104, determine a priority of executing threads corresponding to the processes. After generating the one or more instructions to reimage the ATM, the computing system may return to step 905.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Various embodiments of the disclosure are disclosed herein including but not limited to the following illustrative embodiments:

What is claimed is:

1. A computing system comprising:
one or more processors; and
memory storing computer-readable instructions that, when executed by the one or more processors, cause the computing system to:
retrieve credential data comprising device credentials of an extended reality device and user credentials of a user of the extended reality device, wherein the credential data includes a hardware configuration of the extended reality device or a software configuration of the extended reality device;
retrieve automated teller machine (ATM) data comprising an identifier of an ATM;

send a request to reimage the ATM to an authorization computing system, wherein the request comprises the credential data and the ATM data, wherein the authorization computing system is configured to grant the request based on authentication of the credential data, and wherein reimaging the ATM includes updating software of the ATM;

based on the request to reimage the ATM being granted, generate a virtual environment comprising a virtual representation of the ATM that is configured to cause the ATM to be reimaged based on one or more virtual inputs to reimage the virtual representation of the ATM within the virtual environment; and based on detecting one or more virtual inputs to reimage the virtual representation of the ATM, generate one or more instructions to reimage the ATM.

2. The computing system of claim 1, wherein the extended reality device comprises a virtual reality headset, an augmented reality headset, or one or more controller devices that are configured to generate the one or more virtual inputs based on one or more physical inputs of the user, and wherein the extended reality device is configured to display the virtual environment via one or more display devices of the extended reality device.

3. The computing system of claim 1, wherein the user is represented by an avatar within the virtual environment, and wherein the avatar is configured to convey the one or more virtual inputs based on one or more physical inputs of the user.

4. The computing system of claim 1, wherein the virtual representation of the ATM comprises an interface that displays a virtual representation of ATM data associated with a state of the ATM, and wherein the virtual representation of the ATM data comprises virtual representation of a software version of the ATM, a virtual representation of a memory configuration of the ATM, or a virtual representation of one or more error codes indicating an issue with the ATM.

5. The computing system of claim 1, wherein the memory stores additional computer-readable instructions to determine whether the extended reality device is authorized to reimage the ATM, that when executed by the one or more processors, further cause the computing system to:
determine geo-coordinates associated with the extended reality device; and
based on the geo-coordinates matching an authorized geo-coordinate, determine that the extended reality device is authorized to reimage the ATM.

6. The computing system of claim 1, wherein granting the request to reimage the ATM is based on authentication of the credential data or authorization of the extended reality device, and wherein authentication of the credential data comprises use of a non-fungible token (NFT) stored in a secure distributed ledger platform.

7. The computing system of claim 1, wherein the credential data further comprises one of: a passcode that is used to receive authorization to reimage the ATM, or a location of the extended reality device.

8. The computing system of claim 1, wherein the one or more virtual inputs to reimage the ATM comprise one or more virtual inputs to select a virtual representation of an ATM image and input the virtual ATM image into the virtual representation of the ATM.

9. The computing system of claim 1, wherein the credential data or the ATM data are encrypted using SHA256.

10. The computing system of claim 1, wherein the extended reality device comprises a smartphone, a tablet, or a laptop computing device, and wherein the virtual environment is generated via a display device of the extended reality device, and wherein the one or more virtual inputs are conveyed via one or more input devices of the extended reality device.

11. The computing system of claim 1, wherein the credential data or the ATM data are homomorphically encrypted, and wherein the extended reality device, the authorization computing system, and the ATM are configured to process the credential data or the ATM data that has been homomorphically encrypted.

12. The computing system of claim 1, wherein the virtual environment comprises a three-dimensional visual environment, and wherein the virtual representation of the ATM comprises a three-dimensional visual representation based on a physical appearance of the ATM.

13. A method comprising:

retrieving, by a computing device comprising one or more processors, credential data comprising device credentials of an extended reality device and user credentials of a user of the extended reality device, wherein the credential data includes a hardware configuration of the extended reality device or a software configuration of the extended reality device;

retrieving, by the computing device, automated teller machine (ATM) data comprising an identifier of an ATM;

sending, by the computing device, a request to reimage the ATM to an authorization computing system, wherein the request comprises the credential data and the ATM data, wherein the authorization computing system is configured to authenticate the credential data and determine whether the extended reality device is authorized to reimage the ATM, and wherein reimaging the ATM includes updating software of the ATM;

based on the request to reimage the ATM being granted, generating, by the computing device, a virtual environment comprising a virtual representation of the ATM that is configured to cause the ATM to be reimaged based on one or more virtual inputs to reimage the virtual representation of the ATM within the virtual environment; and based on detecting one or more virtual inputs to reimage the virtual representation of the ATM, generating, by the computing device, one or more instructions to reimage the ATM.

14. The method of claim 13, wherein the extended reality device comprises a virtual reality headset, an augmented reality headset, or one or more controller devices that are configured to generate the one or more virtual inputs based on one or more physical inputs of the user, and wherein the extended reality device is configured to display the virtual environment via one or more display devices of the extended reality device.

15. The method of claim 13, wherein the user is represented by an avatar within the virtual environment, and wherein the avatar is configured to convey the one or more virtual inputs based on one or more physical inputs of the user.

16. The method of claim 13, wherein the virtual representation of the ATM comprises an interface that displays a virtual representation of ATM data associated with a state of the ATM, and wherein the virtual representation of the ATM data comprises virtual representation of a software version of the ATM, a virtual representation of a memory configuration of the ATM, or a virtual representation of one or more error codes indicating an issue with the ATM.

17. The method of claim 13, wherein the determining whether the extended reality device is authorized to reimage the ATM comprises:

determining geo-coordinates associated with the extended reality device; and based on the geo-coordinates matching an authorized geo-coordinate, determining that the extended reality device is authorized to reimage the ATM.

18. The method of claim 13, wherein granting the request to reimage the ATM is based on authentication of the credential data or authorization of the extended reality device, and wherein authentication of the credential data comprises use of a non-fungible token (NFT) stored in a secure distributed ledger platform.

19. The method of claim 13, wherein the credential data further comprises one of: a passcode that is used to receive authorization to reimage the ATM or a location of the extended reality device.

20. One or more non-transitory computer-readable media storing instructions that, when executed by a computing device comprising at least one processor, a communication interface, and memory, cause the computing device to:

retrieve credential data comprising device credentials of an extended reality device and user credentials of a user of the extended reality device, wherein the credential data includes a hardware configuration of the extended reality device or a software configuration of the extended reality device;

retrieve automated teller machine (ATM) data comprising an identifier of an ATM;

send a request to reimage the ATM to an authorization computing system, wherein the request comprises the credential data and the ATM data, wherein the authorization computing system is configured to authenticate the credential data and determine whether the extended reality device is authorized to reimage the ATM, and wherein reimaging the ATM includes updating software of the ATM;

based on the request to reimage the ATM being granted, generate a virtual environment comprising a virtual representation of the ATM that is configured to cause the ATM to be reimaged based on one or more virtual inputs to reimage the virtual representation of the ATM within the virtual environment; and based on detecting one or more virtual inputs to reimage the virtual representation of the ATM, generate one or more instructions to reimage the ATM.

* * * * *